United States Patent
Covington et al.

(10) Patent No.: US 12,077,308 B2
(45) Date of Patent: Sep. 3, 2024

(54) SUPPLEMENTAL ENGINE TRANSITION CONTROL

(71) Applicant: Textron Innovations Inc., Providence, RI (US)

(72) Inventors: Charles Eric Covington, Colleyville, TX (US); Chia-Wei Su, Lewisville, TX (US); Darren Gregory Lang, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 328 days.

(21) Appl. No.: 17/721,015

(22) Filed: Apr. 14, 2022

(65) Prior Publication Data

US 2023/0331392 A1    Oct. 19, 2023

(51) Int. Cl.
   *B64D 35/08*  (2006.01)
   *B64D 31/12*  (2006.01)

(52) U.S. Cl.
   CPC ............. *B64D 31/12* (2013.01); *B64D 35/08* (2013.01)

(58) Field of Classification Search
   CPC .............................. B64D 31/12; B64D 35/08
   See application file for complete search history.

(56) References Cited

U.S. PATENT DOCUMENTS

| | | | |
|---|---|---|---|
| 204,085 A | 5/1878 | Rabbeth | |
| 4,338,525 A | 7/1982 | Kilgore | |
| 5,915,917 A | 6/1999 | Eveker et al. | |
| 5,923,515 A | 7/1999 | Eubanks et al. | |
| 6,010,303 A | 1/2000 | Feulner | |
| 6,059,522 A | 5/2000 | Gertz et al. | |
| 6,198,238 B1 | 3/2001 | Edelson | |
| 6,729,139 B2 | 5/2004 | Desai et al. | |
| 6,986,641 B1 | 1/2006 | Desai et al. | |
| 7,540,450 B2 | 6/2009 | Brand et al. | |
| 7,827,803 B1 | 11/2010 | Wadia et al. | |
| 7,939,962 B2 | 5/2011 | Foch et al. | |

(Continued)

FOREIGN PATENT DOCUMENTS

| | | |
|---|---|---|
| EP | 3693271 A1 | 8/2020 |
| WO | WO-2016049030 A1 | 3/2016 |

OTHER PUBLICATIONS

Covington, Charles Eric, et al.; "Supplemental Engine Power Control"; U.S. Appl. No. 17/342,963, filed Jun. 9, 2021; 43 pages.

(Continued)

*Primary Examiner* — Edwin A Young
(74) *Attorney, Agent, or Firm* — Bradley Arant Boult Cummings LLP

(57) ABSTRACT

A method of operating a multi-engine drive system of an aircraft includes driving a main rotor of the aircraft by a main engine of the multi-engine drive system at an operating speed of the main engine, operating a supplemental engine of the multi-engine drive system at approximately 80% of an operating speed of the supplemental engine, wherein, during the operating step, a clutch interoperably coupled to the supplemental engine is interoperably decoupled from the main rotor and, responsive to a command to interoperably engage the clutch, if the clutch successfully engages such that the clutch is interoperably coupled to the main rotor, providing, by the supplemental engine, power to the main rotor.

19 Claims, 6 Drawing Sheets

(56) References Cited

U.S. PATENT DOCUMENTS

| | | |
|---|---|---|
| 8,080,950 B2 | 12/2011 | Beck et al. |
| 8,274,803 B2 | 9/2012 | Swamy et al. |
| 8,324,746 B2 | 12/2012 | Bradbrook |
| 8,355,855 B2 | 1/2013 | Minto et al. |
| 8,562,284 B2 | 10/2013 | Bradbrook |
| 9,156,560 B2 | 10/2015 | Burns et al. |
| 9,193,453 B2 | 11/2015 | Vallart et al. |
| 9,270,219 B2 | 2/2016 | Lando et al. |
| 9,428,267 B2 | 8/2016 | DeVita et al. |
| 9,821,908 B2 | 11/2017 | Schaeffer et al. |
| 10,260,471 B2 | 4/2019 | Huang |
| 10,392,119 B2 | 8/2019 | Niergarth et al. |
| 10,435,165 B2 | 10/2019 | Swann et al. |
| 10,436,059 B2 | 10/2019 | Liu et al. |
| 10,442,547 B2 | 10/2019 | Miller et al. |
| 10,487,733 B2 | 11/2019 | Morgan |
| 10,696,416 B2 | 6/2020 | Gansler et al. |
| 10,711,693 B2 | 7/2020 | Miller et al. |
| 10,730,633 B2 | 8/2020 | Anghel et al. |
| 10,738,706 B2 | 8/2020 | Gansler et al. |
| 10,788,088 B2 | 9/2020 | Olson et al. |
| 10,793,284 B2 | 10/2020 | Prater et al. |
| 10,953,995 B2 | 3/2021 | Gansler et al. |
| 11,130,456 B2 | 9/2021 | Klemen et al. |
| 11,196,585 B1 | 12/2021 | Auerbach et al. |
| 11,447,015 B1 | 9/2022 | Wiegman et al. |
| 11,473,496 B2 | 10/2022 | Romero et al. |
| 11,682,535 B2 | 6/2023 | Maragni et al. |
| 11,688,568 B2 | 6/2023 | Maragni et al. |
| 2003/0094001 A1 | 5/2003 | Desai et al. |
| 2005/0225303 A1 | 10/2005 | Xu et al. |
| 2010/0013300 A1 | 1/2010 | Lando |
| 2010/0138089 A1 | 6/2010 | James |
| 2010/0148719 A1 | 6/2010 | Fisher et al. |
| 2011/0080040 A1 | 4/2011 | Kumar |
| 2012/0227389 A1 | 9/2012 | Hinderks |
| 2013/0086919 A1 | 4/2013 | Dooley et al. |
| 2013/0094963 A1 | 4/2013 | Rolt |
| 2013/0169036 A1 | 7/2013 | Todd et al. |
| 2013/0247579 A1 | 9/2013 | Morawski et al. |
| 2014/0084677 A1 | 3/2014 | Haillot |
| 2014/0252158 A1 | 9/2014 | Schaeffer |
| 2014/0290208 A1 | 10/2014 | Rechain et al. |
| 2014/0333127 A1 | 11/2014 | Edwards |
| 2014/0363288 A1 | 12/2014 | Schaeffer et al. |
| 2015/0151844 A1 | 6/2015 | Anton et al. |
| 2015/0274306 A1 | 10/2015 | Sheridan |
| 2015/0283908 A1 | 10/2015 | Himmelmann |
| 2015/0333527 A1 | 11/2015 | Rideau et al. |
| 2015/0345403 A1 | 12/2015 | Cai et al. |
| 2015/0367950 A1 | 12/2015 | Rajashekara et al. |
| 2016/0036220 A1 | 2/2016 | Lacaux et al. |
| 2016/0046247 A1 | 2/2016 | Rozman et al. |
| 2016/0069277 A1 | 3/2016 | Meisner et al. |
| 2016/0236790 A1 | 8/2016 | Knapp et al. |
| 2016/0325826 A1 | 11/2016 | Swann |
| 2016/0355272 A1 | 12/2016 | Moxon |
| 2016/0380437 A1 | 12/2016 | Casimir et al. |
| 2017/0044989 A1 | 2/2017 | Gemin et al. |
| 2017/0057650 A1 | 3/2017 | Walter-Robinson |
| 2017/0066541 A1 | 3/2017 | Rossotto |
| 2017/0129617 A1 | 5/2017 | Shah et al. |
| 2017/0175565 A1 | 6/2017 | Sennoun |
| 2017/0184032 A1 | 6/2017 | Poumarede et al. |
| 2017/0225794 A1 | 8/2017 | Waltner |
| 2017/0226933 A1 | 8/2017 | Klonowski et al. |
| 2017/0291712 A1 | 10/2017 | Himmelmann et al. |
| 2017/0294782 A1 | 10/2017 | Navarro |
| 2017/0297695 A1 | 10/2017 | Schaeffer et al. |
| 2018/0002025 A1 | 1/2018 | Lents et al. |
| 2018/0065755 A1 | 3/2018 | Teicholz et al. |
| 2018/0079515 A1 | 3/2018 | Harwood et al. |
| 2018/0141671 A1 | 5/2018 | Anghel et al. |
| 2018/0141674 A1 | 5/2018 | Bailey et al. |
| 2018/0187604 A1 | 7/2018 | Poumarede et al. |
| 2018/0194483 A1 | 7/2018 | Schwöller |
| 2018/0222597 A1 | 8/2018 | Covington et al. |
| 2018/0319283 A1 | 11/2018 | Battin et al. |
| 2018/0354631 A1 | 12/2018 | Adibhatla et al. |
| 2018/0354632 A1 | 12/2018 | Hon et al. |
| 2018/0370646 A1 | 12/2018 | Hon et al. |
| 2019/0000195 A1 | 1/2019 | Golay et al. |
| 2019/0003397 A1 | 1/2019 | Gansler et al. |
| 2019/0003398 A1 | 1/2019 | Gibson et al. |
| 2019/0155282 A1 | 5/2019 | Kim |
| 2019/0165708 A1 | 5/2019 | Smith et al. |
| 2019/0186284 A1 | 6/2019 | Orkiszewski |
| 2019/0345837 A1 | 11/2019 | Bacic |
| 2019/0368500 A1 | 12/2019 | Epstein |
| 2020/0056546 A1 | 2/2020 | Terwilliger et al. |
| 2020/0056551 A1 | 2/2020 | Epstein |
| 2020/0079513 A1 | 3/2020 | Pastouchenko et al. |
| 2020/0095939 A1 | 3/2020 | Epstein |
| 2020/0164975 A1* | 5/2020 | Robertson ............... B64C 29/00 |
| 2020/0182158 A1 | 6/2020 | Kupratis |
| 2020/0248619 A1 | 8/2020 | Romero et al. |
| 2020/0248760 A1 | 8/2020 | Olson et al. |
| 2020/0284265 A1 | 9/2020 | Reepmeyer et al. |
| 2020/0408148 A1* | 12/2020 | Beauchesne-Martel ..................... B64D 31/12 |
| 2021/0246837 A1 | 8/2021 | Romero et al. |
| 2022/0063824 A1 | 3/2022 | Hiett et al. |
| 2022/0063826 A1 | 3/2022 | Hiett et al. |
| 2022/0065175 A1 | 3/2022 | McQuiston et al. |
| 2022/0065177 A1 | 3/2022 | McQuiston et al. |
| 2022/0251966 A1 | 8/2022 | Hiett et al. |
| 2022/0252007 A1 | 8/2022 | Hiett et al. |
| 2024/0017823 A1 | 1/2024 | Parsons et al. |

OTHER PUBLICATIONS

Parsons, Thomas Dewey, et al.; "Optimizing Usage of Supplemental Engine Power"; U.S. Appl. No. 17/867,231, filed Jul. 18, 2022; 60 pages.

* cited by examiner

SUPPLEMENTAL ENGINE TRANSITION CONTROL

STATEMENT REGARDING FEDERALLY-SPONSORED RESEARCH OR DEVELOPMENT

This invention was made with government support under Agreement No. W911W6-19-9-0002, awarded by the U.S. Army Contracting Command-Redstone Arsenal. The government has certain rights in the invention.

CROSS-REFERENCE TO RELATED APPLICATIONS

This patent application incorporates by reference the entire disclosure of U.S. patent application Ser. No. 17/342,963, filed on Jun. 9, 2021.

TECHNICAL FIELD

This disclosure relates in general to the field of aircraft, and more particularly, but not by way of limitation, to managing the distribution of power between a main engine and a supplemental engine and controlling transitions between an auxiliary-power-unit ("APU") mode and a supplemental-power-unit ("SPU") mode of the supplemental engine.

BACKGROUND

This section provides background information to facilitate a better understanding of the various aspects of the disclosure. It should be understood that the statements in this section of this document are to be read in this light, and not as admissions of prior art.

Some conventional rotorcraft have an auxiliary engine to drive one or more of generators, pumps, or accessories that are shared by a main drive system. It would be advantageous to be able to utilize an auxiliary engine to a main drive system. However, transitioning an auxiliary engine between an auxiliary-power-unit ("APU") mode and a supplemental-power-unit ("SPU") mode has been problematic.

SUMMARY

A method of operating a multi-engine drive system of an aircraft includes driving a main rotor of the aircraft by a main engine of the multi-engine drive system at an operating speed of the main engine, operating a supplemental engine of the multi-engine drive system at approximately 80% of an operating speed of the supplemental engine, wherein, during the operating step, a clutch interoperably coupled to the supplemental engine is interoperably decoupled from the main rotor and, responsive to a command to interoperably engage the clutch, if the clutch successfully engages such that the clutch is interoperably coupled to the main rotor, providing, by the supplemental engine, power to the main rotor.

A method of operating a multi-engine drive system of an aircraft includes driving a main rotor of the aircraft by a main engine of the multi-engine drive system at an operating speed of the main engine, operating a supplemental engine of the multi-engine drive system at an operating speed of the supplemental engine, wherein, during the operating step, a clutch interoperably coupled to the supplemental engine is interoperably coupled to the main rotor, responsive to a supplemental-engine idle command, reducing a speed of the supplemental engine to approximately 65% of the operating speed of the supplemental engine, the main engine operating at 100% of the operating speed of the main engine and, responsive to a command to disengage the clutch, interoperably decoupling the clutch from the main rotor such that the supplemental engine does not provide power to the main rotor and increasing a speed of the main engine to approximately 100% of the operating speed of the main engine.

A computer system comprising a processor and memory, wherein the processor and the memory in combination are operable to implement a method including driving a main rotor of an aircraft by a main engine of a multi-engine drive system at an operating speed of the main engine, operating a supplemental engine of the multi-engine drive system at approximately 80% of an operating speed of the supplemental engine, wherein, during the operating step, a clutch interoperably coupled to the supplemental engine is interoperably decoupled from the main rotor and, responsive to a command to interoperably engage the clutch, if the clutch successfully engages such that the clutch is interoperably coupled to the main rotor, providing, by the supplemental engine, power to the main rotor.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
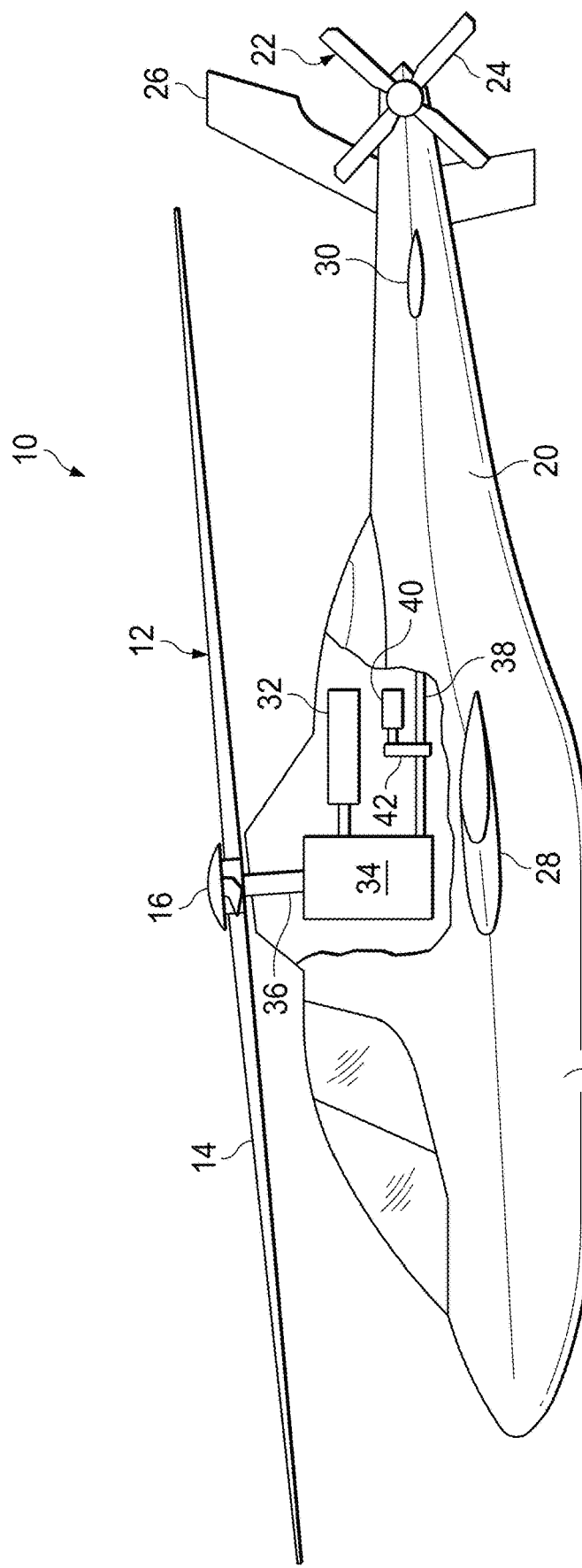
FIG. 1 is a schematic illustration of an illustrative rotorcraft implementing a supplemental engine power control system according to one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an illustrative embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

Referring to FIG. 1, a rotorcraft in the form of a helicopter is schematically illustrated and generally designated 10. The primary propulsion assembly of the helicopter 10 is a main rotor assembly 12. The main rotor assembly 12 includes a plurality of rotor blades 14 extending radially outward from a main rotor hub 16. The main rotor assembly 12 is coupled to a fuselage 18 and is rotatable relative thereto. The pitch of the rotor blades 14 can be collectively and/or cyclically manipulated to selectively control direction, thrust, and lift of the helicopter 10. A tailboom 20 is coupled to the fuselage 18 and extends from the fuselage 18 in the aft direction. An anti-torque system 22 includes a tail rotor assembly 24 coupled to an aft end of the tailboom 20. The anti-torque system 22 controls yaw of the helicopter 10 by counteracting torque exerted on the fuselage 18 by the main rotor assembly 12. In the embodiment in FIG. 1, the helicopter 10 includes a vertical tail fin 26 that provides stabilization to the helicopter 10 during high-speed forward flight. In addition, the helicopter 10 includes wing members 28 that extend laterally from the fuselage 18 and wing members 30 that extend laterally from the tailboom 20. The wing members 28, 30 provide lift to the helicopter 10 responsive to the forward airspeed of the helicopter 10, thereby reducing lift requirements imposed on the main rotor assembly 12 and increasing top speed of the helicopter 10.

The main rotor assembly 12 and the tail rotor assembly 24 receive torque and rotational energy from a main engine 32. The main engine 32 is coupled to a main rotor gearbox 34 by suitable clutching and shafting. The main rotor gearbox 34 is coupled to the main rotor assembly 12 by a mast 36 and is coupled to the tail rotor assembly 24 by a tail rotor drive shaft 38. In the embodiment illustrated in FIG. 1, a supplemental engine 40 (i.e., supplemental power unit) is coupled to the tail rotor drive shaft 38 by a supplemental engine gearbox 42 that provides suitable clutching therebetween. Together, the main engine 32, the main rotor gearbox 34, the tail rotor drive shaft 38, the supplemental engine 40, and the supplemental engine gearbox 42, as well as the various other shafts and gearboxes coupled therein, may be considered as a torque-summing powertrain of the helicopter 10.

The supplemental engine 40 is operable as an auxiliary power unit ("APU") in an APU mode to power accessories of the helicopter 10 such as, for example, electric generators, hydraulic pumps, and the like, as well as to provide power required to start the main engine 32. In addition, the supplemental engine 40 is operable as a supplemental power unit ("SPU") in an SPU mode to provide supplemental power that is additive to the power provided by the main engine 32.

The helicopter 10 is merely illustrative of a variety of aircraft that can implement the principles disclosed herein. Indeed, the torque-summing powertrain of the present disclosure may be implemented on any rotorcraft. Other aircraft implementations can include hybrid aircraft, tiltwing aircraft, tiltrotor aircraft, quad tiltrotor aircraft, unmanned aircraft, gyrocopters, propeller-driven airplanes, compound helicopters, drones, and the like. As such, those skilled in the art will recognize that the torque-summing powertrain of the present disclosure can be integrated into a variety of aircraft configurations. It should be appreciated that, even though aircraft are particularly well-suited to implement principles of the present disclosure, non-aircraft vehicles and devices can also implement the principles disclosed herein.

Figure 2:
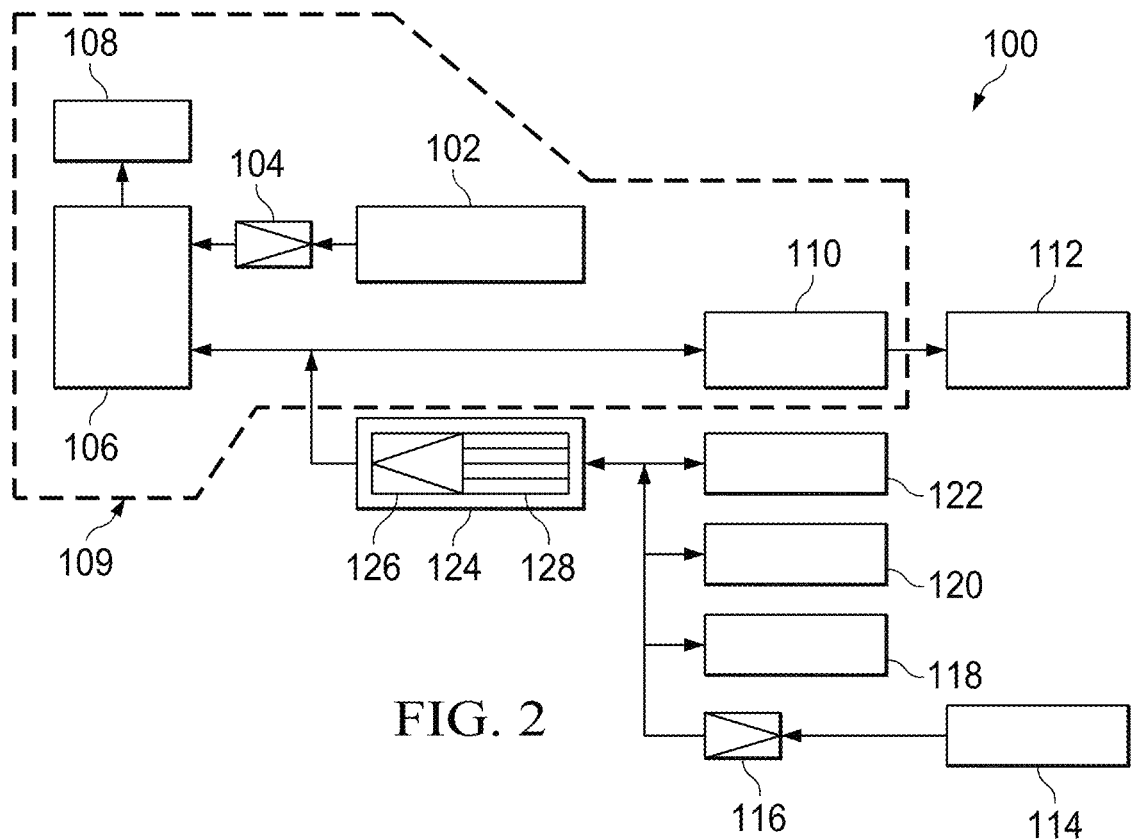
FIG. 2 is block diagram illustrating an illustrative main engine and supplemental engine torque-summing powertrain according to one or more aspects of the disclosure.

Referring also to FIG. 2, an illustrative torque-summing powertrain 100 for a rotorcraft is illustrated in a block diagram format. The torque-summing powertrain 100 includes a main engine 102, such as, for example, a turboshaft engine capable of producing 2,000 to 4,000 horsepower or more, depending upon the particular implementation. The main engine 102 is coupled to a freewheeling unit depicted as sprag clutch 104 that acts as a one-way clutch enabling a driving mode, wherein torque from the main engine 102 is coupled to the main rotor gearbox 106 when the input side rotating speed to the sprag clutch 104 is matched with the output side rotating speed from the sprag clutch 104. For convenience of illustration, the input side of the sprag clutch 104 is depicted as the apex of the greater than symbol and the output side of the sprag clutch 104 is depicted as the open end of the greater than symbol. The sprag clutch 104 has an overrunning mode in which the main engine 102 is decoupled from the main rotor gearbox 106 when the input side rotating speed of the sprag clutch 104 is less than the output side rotating speed of the sprag clutch 104. Operating the sprag clutch 104 in the overrunning mode allows, for example, the main rotor 108 of the helicopter 10 to engage in autorotation in the event of a failure of the main engine 102.

In the illustrated embodiment, the main rotor gearbox 106 is coupled to the sprag clutch 104 via a suitable drive shaft. In addition, the main rotor gearbox 106 is coupled to the main rotor 108 by a suitable mast. The main rotor gearbox 106 includes a gearbox housing and a plurality of gears, such as planetary gears, used to adjust the engine output to a suitable rotational speed so that the main engine 102 and the main rotor 108 may each rotate at optimum speed during flight operations of the helicopter 10. The main rotor gearbox 106 may be coupled to a tail rotor gearbox 110 via a suitable tail rotor drive shaft. The tail rotor gearbox 110 includes a gearbox housing and a plurality of gears that may adjust the main rotor gearbox output to a suitable rotational speed for operation of the tail rotor 112. The main engine 102, the sprag clutch 104, the main rotor gearbox 106, and the tail rotor gearbox 110, as well as the various shafts and gearing systems coupled therewith are shown as a main drive system 109 of the torque-summing powertrain 100.

The torque-summing powertrain 100 includes a supplemental engine 114, such as, for example, a turboshaft engine capable of producing 200 to 600 horsepower or more, depending upon the particular implementation. In the illustrated embodiment, the supplemental engine 114 may generate between about 5% and about 20% of the horsepower of the main engine 102. In other embodiments, the supplemental engine 114 may generate between about 10% and about 15% of the horsepower of the main engine 102. The supplemental engine 114 is coupled to a freewheeling unit depicted as a sprag clutch 116 that acts as a one-way clutch enabling a driving mode, wherein torque from the supplemental engine 114 is coupled through the sprag clutch 116 from the input side to the output side. The sprag clutch 116 has an overrunning mode in which the supplemental engine 114 is decoupled from torque transfer with the sprag clutch 116 when the input side rotating speed of the sprag clutch 116 is less than the output side rotating speed of the sprag clutch 116. Operating the sprag clutch 116 in the overrunning mode allows, for example, the main engine 102 to drive the rotorcraft accessories such as one or more generators 118, one or more hydraulic pumps 120, or other accessories 122 when the supplemental engine 114 is not operating. The supplemental engine 114 and the sprag clutch 116 as well as the various shafts and gearing systems coupled therewith may be considered a secondary drive system of the torque-summing powertrain 100.

Disposed between the main drive system 109 and the secondary drive system of the torque-summing powertrain 100 is a selectable clutch assembly 124 that has a unidirectional torque transfer mode and a bidirectional torque transfer mode. In the unidirectional torque transfer mode of the selectable clutch assembly 124, torque can be driven from the main drive system 109 to the secondary drive system of the torque-summing powertrain 100 but torque cannot be driven from the secondary drive system to the main drive system 109 of the torque-summing powertrain 100. In the bidirectional torque transfer mode of the selectable clutch assembly 124, torque can be driven from the main drive system 109 to the secondary drive system of the torque-summing powertrain 100 and torque can be driven from the secondary drive system to the main drive system 109 of the torque-summing powertrain 100. In the illustrated embodiment, the selectable clutch assembly 124 includes a freewheeling unit depicted as a sprag clutch 126 and a bypass assembly 128. The sprag clutch 126 acts as a one-way clutch enabling a driving mode, wherein torque from the main drive system 109 is coupled through the sprag clutch 126 from the input side to the output side. The sprag clutch 126 also has an overrunning mode wherein the main drive system 109 is decoupled from torque transfer with the sprag clutch 126 when the input side rotating speed of the sprag clutch 126 is less than the output side rotating speed of the sprag clutch 126. When the overrunning mode of the sprag clutch 126 is enabled, the selectable clutch assembly 124 is in the unidirectional torque transfer mode. The overrunning mode of the selectable clutch assembly 124 can be disabled by engaging the bypass assembly 128 with the sprag clutch 126. When the bypass assembly 128 prevents the sprag clutch 126 from operating in the overrunning mode, the selectable clutch assembly 124 is in the bidirectional torque transfer mode.

When the main engine 102 is operating, torque is delivered through the main drive system 109 as indicated by the solid lines and arrowheads between the components within the main drive system 109. In addition, as the main drive system 109 is turning, torque may be applied to the selectable clutch assembly 124. As discussed herein, in order to shift the selectable clutch assembly 124 from the unidirectional torque transfer mode to the bidirectional torque transfer mode, power should be applied to the input side of the sprag clutch 126 from the main drive system 109 such that the input side and the output side of the sprag clutch 126 are turning together. The bypass assembly 128 can now be actuated from the disengaged position to the engaged position, placing the selectable clutch assembly 124 in the bidirectional torque transfer mode. The operations of engaging and disengaging the bypass assembly 128 may be pilot controlled and/or may be automated by the flight control computer of the helicopter 10 and may be determined according to the operating conditions of the helicopter 10. In this configuration, power from the supplemental engine 114 augments the power of the main engine 102 within the main drive system 109, as indicated by the solid lines and arrowhead from the selectable clutch assembly 124 to the main drive system 109. This configuration may be referred to as the enhanced power configuration of the torque-summing powertrain 100 wherein the main engine 102 and the supplemental engine 114 are operating together and the selectable clutch assembly 124 is in the bidirectional torque transfer mode. The selectable clutch assembly 124 may be engaged and additive supplemental power applied to the main rotor during normal operations in which the load that on the main engine is sufficient to govern the rotor speed. For example, the selectable clutch assembly 124 may not be engaged if the supplemental power would reduce the load on the main engine below that under which the main engine can govern rotor speed. Aspects of the torque-summing powertrain 100 are disclosed in US Patent App. Publication No. 2020/0248760, which is incorporated herein by reference.

Figure 3:
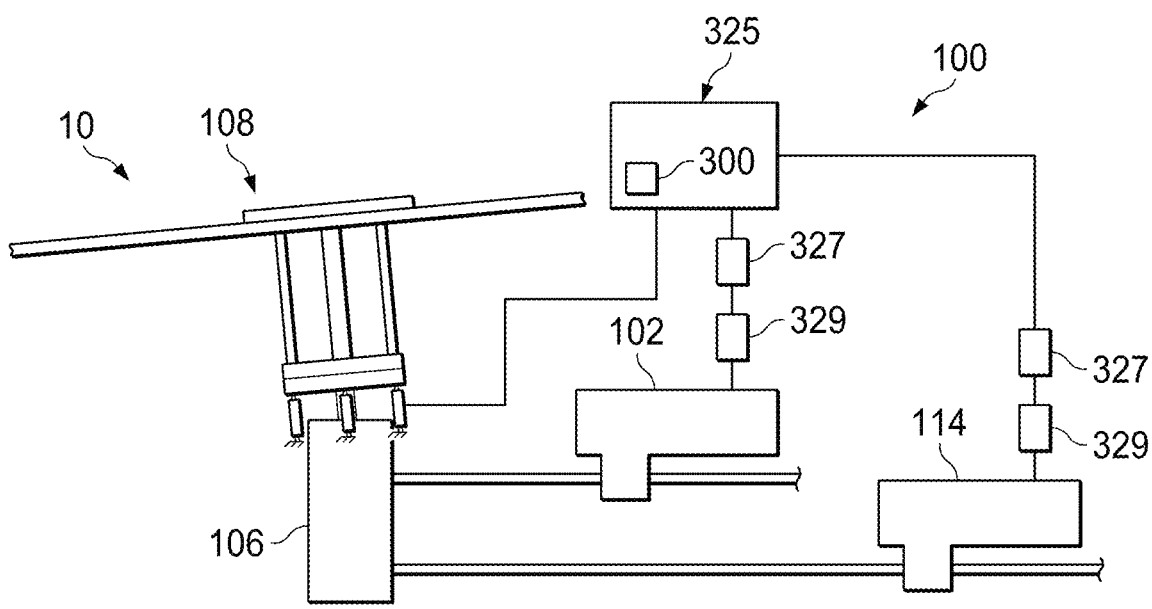
FIG. 3 is schematic illustration of a rotorcraft powertrain with an illustrative system for implementing supplemental engine power control.
Figure 4:
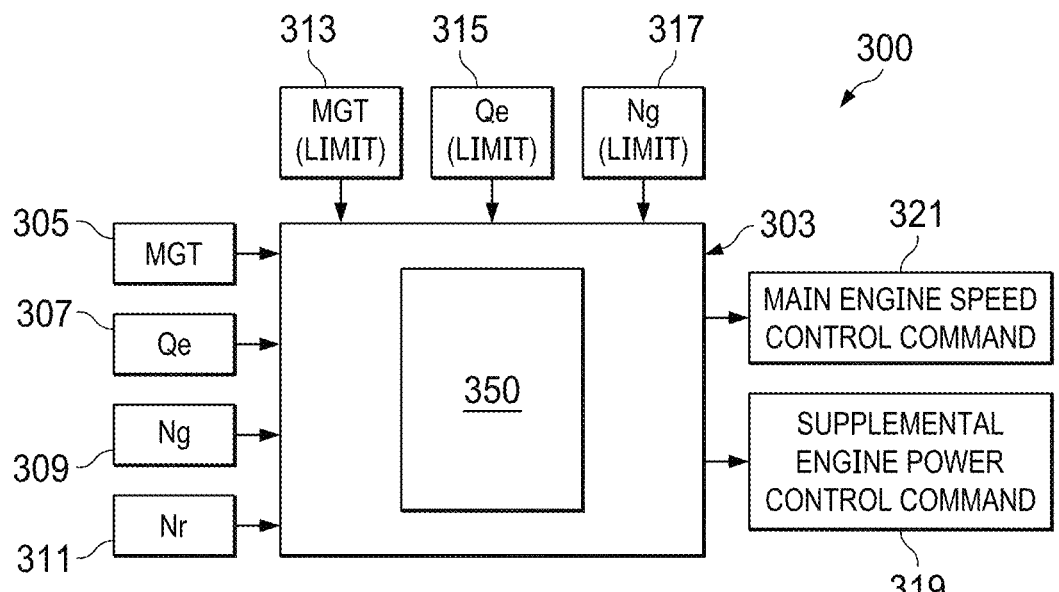
FIG. 4 is schematic illustration of a system for calculating and commanding rotor speed control of a main engine and commanding power control of a supplemental engine according to one or more aspects of the disclosure.

Referring now also to FIGS. 3 and 4, a system 300 is illustrated in conjunction with the helicopter 10 and the torque summing powertrain 100. It should be appreciated that though system 300 is illustrated with regard to the helicopter 10, the system 300 may also be implemented on other aircraft. Further, it should be appreciated that the system 300 can be implemented in a wide variety of configurations, depending in part on the flight control configuration of the aircraft.

The system 300 is particularly well-suited for implementation in aircraft having a fly-by-wire flight control computer, such as a flight control computer 325; however, non-fly-by-wire aircraft can also utilize the system 300. For example, the system 300 can be utilized in a flight control system having collective actuators that can receive commands from a trim motor, autopilot system, or any other system that allows collective commands to be realized by collective actuators. Further, the system 300 is particularly well suited for implementation with aircraft having engines controlled by an engine control unit 327, such as a FADEC (full authority digital engine control) system. However, the system 300 can also be implemented on an aircraft having an engine that is not controlled by an engine control unit such as the engine control unit 327; in such an embodiment, the system 300 can make fuel control commands directly to a fuel control unit 329, for example. The system 300 is preferably integrated with a flight control computer 325; however, in another embodiment, the system 300 can be a standalone computer system within the aircraft.

The system 300 can include a processor 303 configured for processing receivable data in one or more algorithms 350 for calculating total power demand, supplemental power demands, and subsequently making commands, e.g., a main engine speed command, and supplemental engine power command, to adaptively affect rotor speed. The processor 303 can receive real time operational data from sensors, instrumentation, and the like. The processor 303 can receive real time data pertaining to a measured gas temperature (MGT) 305, engine torque (Qe) 307, main-engine gas-generator speed and supplemental-engine gas generator speed (Ng, Ngs) 309 approximating power, and main rotor speed (Nr) 311, which corresponds to main-engine power-turbine speed (Np). Allowable engine limits for each of the main and the supplemental engine, such as measure gas temperature (MGT) limit 313, main-engine gas-generator speed and supplemental-engine gas generator speed (Ng, Ngs) limits 317, as well as a torque (Qe) limit 315, are in data communication with processor 303. Allowable engine limits 313, 317, and torque limit 315, can be stored in a database within the processor 303, or can be stored remotely, as long as limits 313, 315, and 317 are available for analysis. The processor 303 is configured to perform analysis using one or more algorithms and subsequently issue supplemental engine power commands 319 and a main engine speed command 321.

The main engine 102 and the supplemental engine 114 are different sizes, i.e., different horsepower ratings, and may be from different manufacturers. The system 300 is configured to separately control the main engine 102 and the supplemental engine 114 to supply total power required to maintain the main rotor speed within an acceptable range. The system 300 controls the main engine 102 to govern the main rotor speed (Nr), for example in similar manner as with a conventional single engine or twin-engine powertrain. The system 300 implements the supplemental engine 114 power control via an Ngs (supplemental-engine gas generator speed) command to provide a proportion of the total power demand, which is subtracted from the main engine 102 power compensation command. The supplemental engine 114 only receives a supplemental power demand and does not respond to changes in rotor speed. The system 300 facilitates operating the supplemental engine 114 in the enhanced power configuration when the proportion of the total power demand of the main engine 102 is sufficient for the main rotor speed to be governed by the main engine 102.

A system computed main engine power compensation command is used to adjust the power output of the main engine to reduce rotor speed variation in response to load variations. The main engine power compensation command may be calculated by the system anticipating the power demand on the engine and transmitting the main engine power compensation command to the governor on the main engine to adjust the power output of the main engine. Non-limiting illustrative methods and systems for governing rotor speed are disclosed in US Patent Application Publication Nos. 2014/0252158, 2014/0363288, and 2018/0222597, each of which is incorporated herein by reference.

The system controls the supplemental engine to provide a proportion of the total power demand. The supplemental engine provides power in response to a system computed supplemental engine power demand signal, effectively decoupling the dynamics of the main engine and the supplemental engine. The main engine power compensation command is adjusted to account for the supplemental engine power demand. The supplemental engine power demand can be computed as a function of control inputs and flight conditions or in proportion to the total power demand. The supplemental engine power demand may be computed per schedule and limits.

Figure 5:
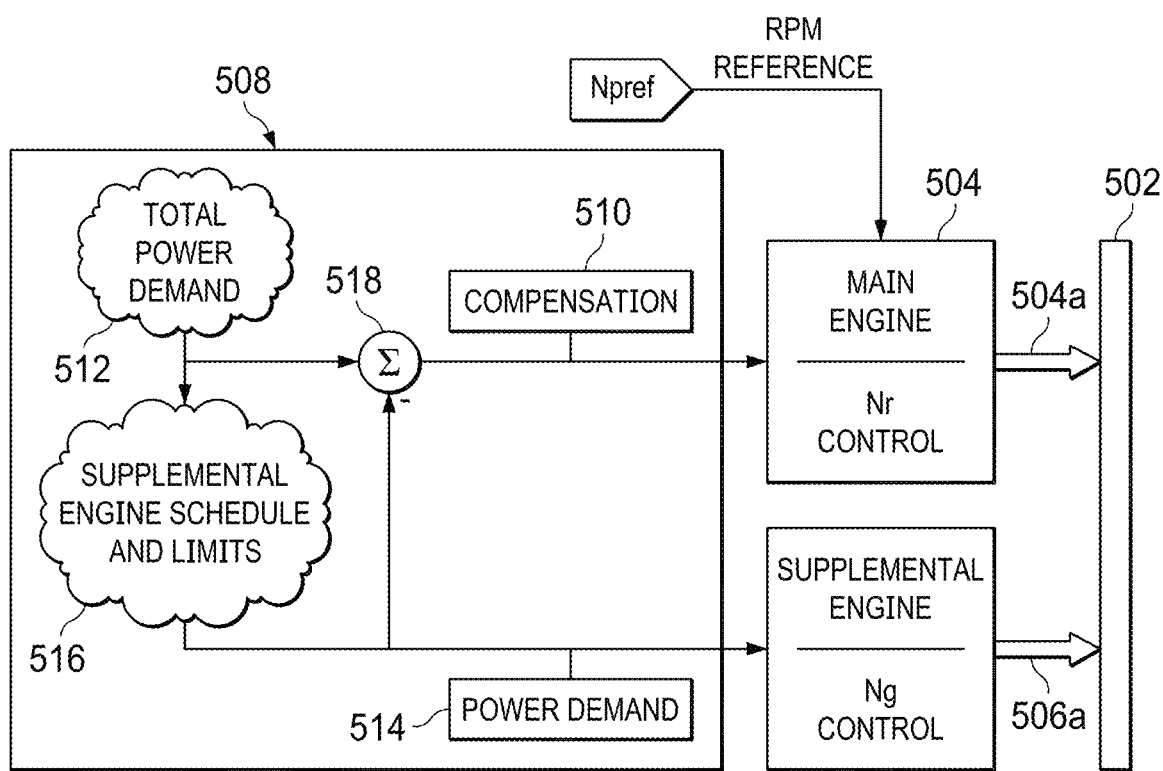
FIG. 5 is a schematic illustration of a rotorcraft implementing an illustrative supplemental engine power control system.

Referring also to FIG. 5, a rotorcraft 500 includes a main rotor drive system 502 (e.g., main rotor and main rotor gearbox) and a main engine 504 and a supplemental engine 506 coupled to the drive system. The supplemental engine 506 is smaller than the main engine 504; for example, the supplemental engine 506 may be approximately 20% of the size of the main engine 504. A computer 508 (e.g., flight computer) is configured to divide the control domain between the main engine 504 and the supplemental engine 506. The main engine 504 controls main rotor speed (Nr), which is proportional to main-engine power turbine speed (Np), for example in a similar fashion to a traditional system with a single turboshaft engine or twin identical engines. The main engine 504 provides power to maintain the main rotor speed with a level of compensation for load variation. The main engine 504 has an engine controller that measures the main rotor speed (Nr) and adjusts main engine power 504*a* to reduce RPM variation in response to load variations. The computer 508 can communicate a main engine power compensation command 510 to the main engine 504 (e.g., the power turbine) in anticipation of the load variations for example due to flight conditions, ambient conditions, and pilot inputs.

The supplemental engine 506 works to satisfy a power demand as opposed to the main engine 504 which works to satisfy an RPM demand. Total power demand 512 is calculated for what the rotorcraft 500 is currently doing and is routed toward the main engine 504 as the power compensation command. A portion of total power demand 512 is allocated to the supplemental engine 506, as a supplemental engine power demand 514, based on logic 516 (e.g., schedules and limits). Different techniques can be used to control the supplemental engine 506. For example, the supplemental engine power demand 514 may be supplemental-engine gas generator speed (Ngs) based (demanding Ngs is proportional to power), measured gas temperature (MGT) based (demanding a temperature), fuel flow (WF) based (demanding a rate of fuel flow), or engine torque (Qe) based (demanding a torque). Ambient correction and low frequency closed-loop correction may be applied to reduce errors, if necessary.

To mitigate supplemental engine power 506*a* from being perceived by the main engine 504 as a disturbance, supplemental engine power demand 514 is subtracted at block 518 from total power demand 512, resulting in main engine power compensation command 510.

The schedules are built to achieve certain attributes. For example, and without limitation, the supplemental engine should be at maximum power when regard for efficiency in some flight envelopes and for safety. The supplemental power demand is forced to maximum power for autorotation if the main engine fails or due to rotor speed droop, which is indicative of a main engine failure. In low-power conditions, the supplemental engine power demand is reduced to ensure adequate load remains on the main engine so that it can continue to govern rotor speed. A low limit may be placed on the supplemental engine power demand to ensure that the supplemental engine sprag clutch, e.g., the clutch 126 of the selectable clutch 124, remains engaged. The high limit takes priority over the low limit during normal operation when the main engine is controlling rotor speed. Limits, gains, and other parameters can be varied with flight condition to optimize performance. Supplemental-engine limiting loops, such as MGT, Ngs, and Qe, may be utilized, and the system control algorithm adjusts when the limiting loops are active. The supplemental engine power demand control may have a supplemental-engine power-turbine speed (Nps) loop in case of overspeed, for example approximately 3%, to switch the supplemental engine to rotor speed (RPM) command to avoid increasing the rotor overspeed.

Figure 6:
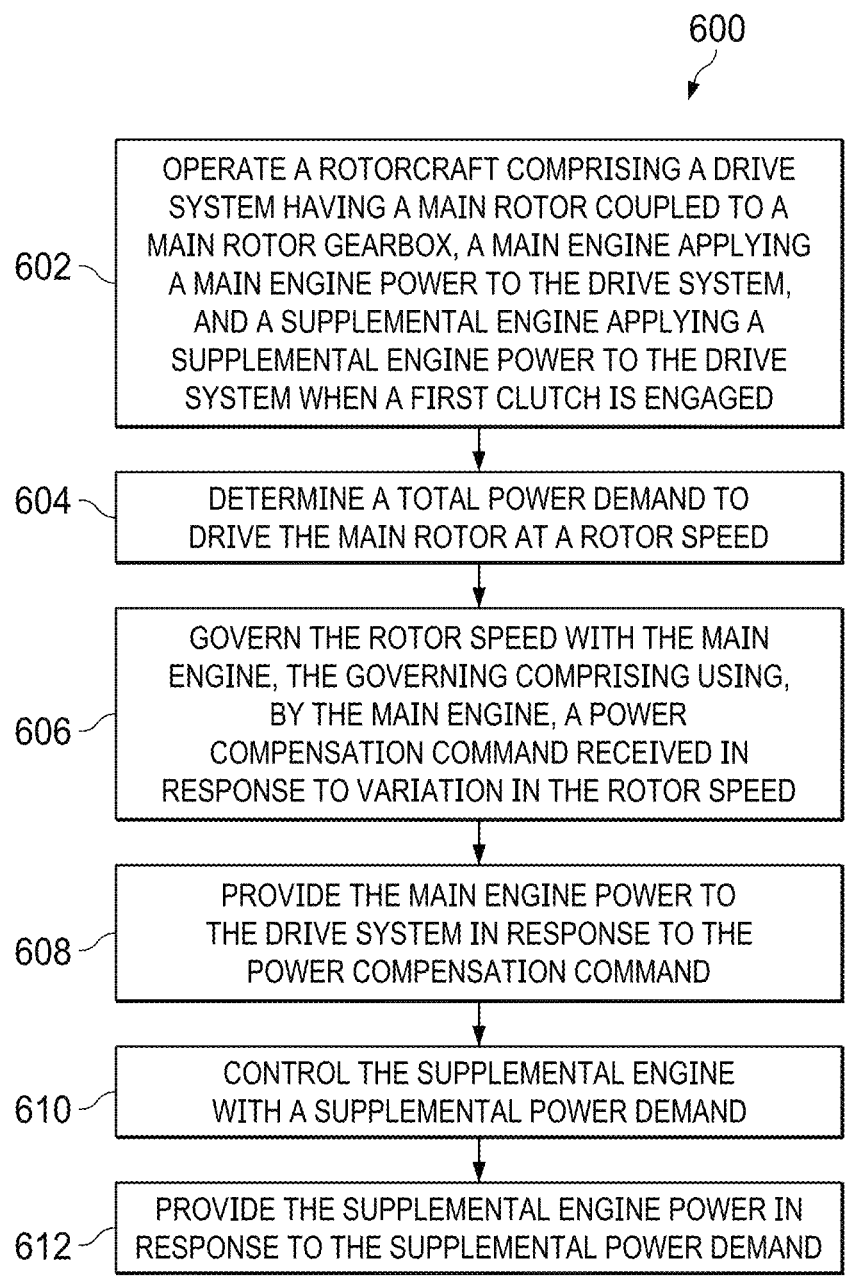
FIG. 6 is a flow diagram of an illustrative method of supplemental engine power control.

FIG. 6 illustrates an illustrative method 600 for power control of a supplemental engine, which is described with additional reference to FIGS. 1-5. At block 602, a rotorcraft is operated. The rotorcraft includes a drive system having a main rotor coupled to a main rotor gearbox. A main engine applies a main engine power to the drive system and a supplemental engine applies a supplemental engine power to the drive system when a first clutch, e.g., clutch 126 (FIG. 2), is engaged. At block 604, a total power demand, to drive the main rotor at a rotor speed, is determined. The total power demand accounts the main engine power and the supplemental engine power. At block 606, the main engine governs the rotor speed. The governing comprises, for example, using a power compensation command generated in response to anticipated load variations to reduce rotor speed variation. At block 608, the main engine power is provided to the drive system in response to receiving the power compensation command. At block 610, the supplemental engine is controlled with a supplemental power demand. At block 612, the supplemental engine power is provided to the drive system in response to the supplemental power demand.

In a typical embodiment, the supplemental engine (e.g., the supplemental engine 114) is able to be started, brought to idle RPM and power, brought to operating RPM and power, and shut down regardless of the operating state of the main engine and regardless of whether or not the supplemental engine is interoperably coupled to the main drive system. Various embodiments permit automatic-control speed and power commands of the supplemental engine to and from APU mode and SPU mode, prevent a pilot from commanding damaging transitions between APU mode and SPU mode, and provide pilot awareness of an operating state of the supplemental engine.

In the APU mode, the supplemental engine is not mechanically coupled to the main drive system. In the APU mode, the supplemental engine may be commanded by the pilot, for example, to enter an OFF state, an IDLE state (e.g., approximately 65% RPM), or a RUN state (e.g., approximately 80% RPM). In the RUN state, the APU may be commanded to a reduced operating power.

In the SPU mode, the supplemental engine is mechanically coupled to the main drive system. In the SPU mode, the supplemental engine may be commanded by the pilot, for example, to the OFF state, an IDLE state (e.g., approximately 65% RPM), or a RUN state. In the RUN state, variable RPM and power can be commanded in accordance with flight conditions and design constraints.

Typical aircraft startup procedures require that the supplemental engine be in APU mode in order for the supplemental engine to power generators used to start the main engine. In such cases, the main engine is then transitioned from OFF to a main-engine IDLE state (approximately 70% Nr), then to a main-engine FLY state (approximately 100% Nr). In a typical embodiment, accessories initially powered by the supplemental engine become powered by the main engine during this transition, which serves to remove the accessory load from the supplemental engine such that the supplemental engine automatically transitions to a STANDBY state.

In a typical embodiment, the pilot is provided visual indication of the operating mode of the supplemental engine (e.g., APU mode or SPU mode) and the state of the supplemental engine (e.g., OFF, IDLE, RUN, STANDBY, or AUTOROTATION), combined into text such as "APU OFF" or "SPU RUN." In some embodiments, the pilot is provided with push-button engine controls for supplemental engine ON/OFF, supplemental engine IDLE/RUN, and supplemental engine clutch control.

Transition from APU mode to SPU mode couples the supplemental engine to the main drive system through engagement of a spline clutch. In a typical embodiment, to prevent damage to the spline clutch, decoupling of the supplemental engine from the main drive system is performed when the supplemental engine provides no power to the main drive system.

Engagement of the spline clutch requires alignment of spline teeth with the supplemental-engine gearbox. Spline engagement is controlled by an actuator connected to the spline through a spring. The spring allows full actuator engagement even if spline misalignment prevents spline engagement. Clutch engagement may be manual or automatic. In an embodiment in which manual clutch engagement is employed, interlocks are provided to preclude inappropriate clutch engagement and disengagement.

During transition from APU mode to SPU mode, full extension of the actuator results in the system commanding an automatic speed profile from an APU-mode speed of approximately 80% to slightly above a main drive system speed, then back to slightly below the main drive system speed. This process is intended to cause engagement of the spline teeth if not already engaged. If successful, the splines will fully engage, and the supplemental engine will transition to SPU Mode. If unsuccessful, the supplemental engine is returned to APU mode, and the pilot can de-select and re-select the clutch to re-attempt spline engagement. Once the supplemental engine is in SPU mode, disengagement of the spline causes the supplemental engine to be transitioned to APU mode.

Figure 7:
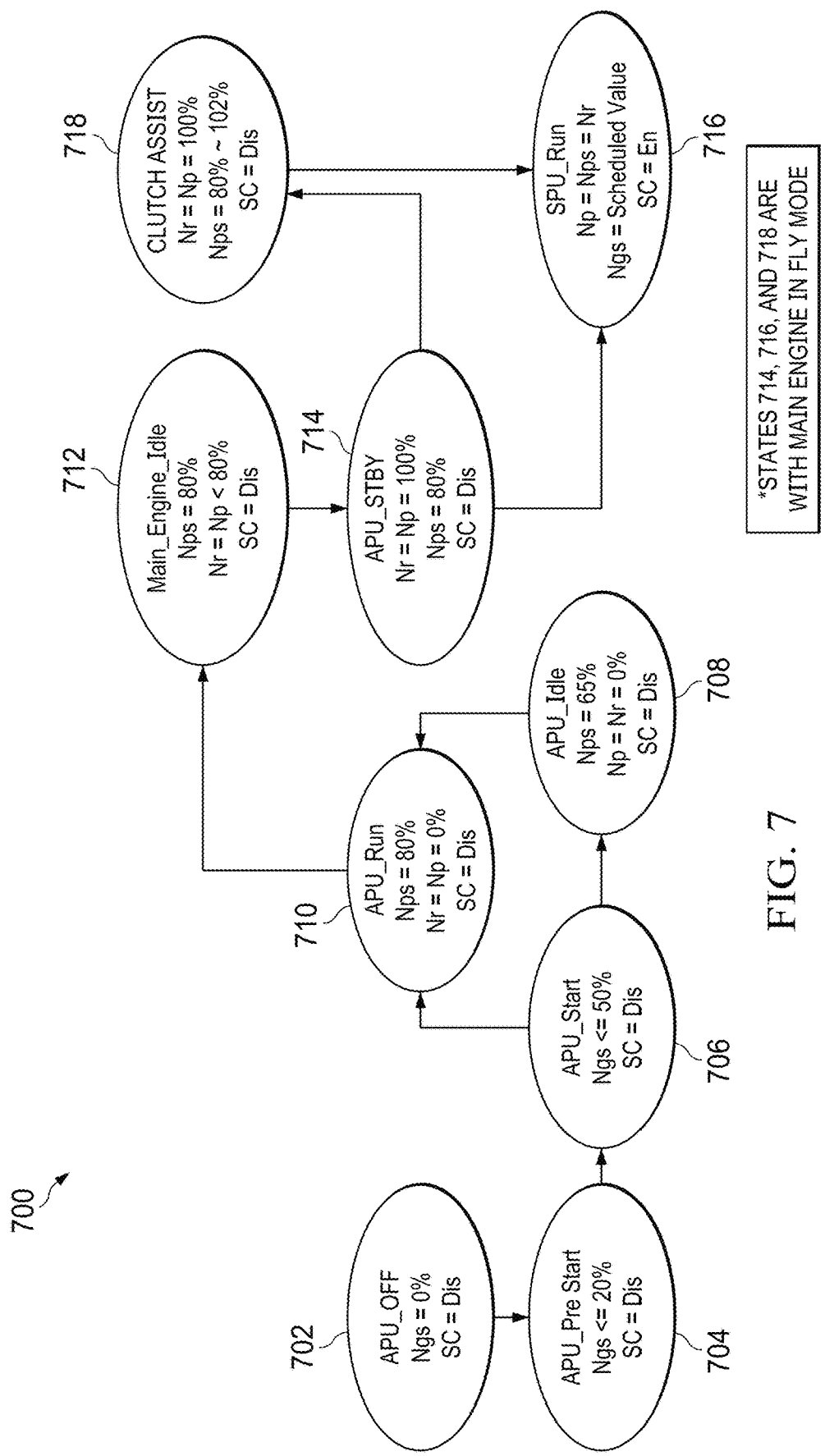
FIG. 7 is a state diagram of an illustrative method of transitioning a supplemental engine from an auxiliary-power-unit ("APU") mode to a supplemental-power-unit ("SPU") mode.

FIG. 7 is a state diagram of an illustrative method of transitioning a supplemental engine (e.g., the supplemental engine 114) from an auxiliary-power-unit ("APU") mode to a supplemental-power-unit ("SPU") mode. State diagram 700 begins at state 702, at which state the supplemental engine is not powered, the state 702 being designated as APU_Off, with the supplemental-engine gas generator speed (Ngs) at 0% of operating speed and the main spline clutch (SC) (e.g., sprag clutch 126) disengaged (SC=Dis).

Responsive to a supplemental-engine ON command, execution proceeds to state 704, at which state the supplemental engine enters into a state referred to as APU_Pre Start. In state 704, Ngs increases from 0% to less than or equal to approximately 20% of operating speed and SC remains disengaged. In a typical embodiment, Ngs is in a state indicative that it is safe to operate the starter and a starter moves Ngs from approximately 0% to approximately 20%.

Responsive to a supplemental-engine START command, execution proceeds from state 704 to state 706, which state is designated APU_Start, in which Ngs is increased to less than or equal to approximately 50% of operating speed and SC remains disengaged. The starter is also utilized to move Ngs from approximately 20% to less than or equal to approximately 50%." From state 706, execution may proceed to state 708 or state 710. Execution proceeds to state 710 if a supplemental-engine RUN command is selected. Execution proceeds to state 708 if a supplemental-engine IDLE command is selected. In a typical embodiment, the pilot may select the supplemental-engine RUN command, in which case transitioning directly from state 706 to state 710 will occur, or may select the supplemental-engine RUN command after the supplemental-engine IDLE command has been selected, state 708 has been reached, and then select the supplemental-engine RUN command from state 708.

At state 708, which state is designated APU_Idle, supplemental-engine power-turbine speed (Nps) is increased to approximately 65% of operating speed, main-engine rotor speed (Nr) and main-engine power turbine speed (Np) are at 0% of operating speeds, and SC remains disengaged. From state 708, execution proceeds to state 710. At state 710, which state is designated APU_Run, Nps is increased to 80% of operating speed, Nr and Np remain at 0% of operating speeds, and SC remains disengaged.

From state 710, responsive to a command for the main engine (e.g., the main engine 102) to enter into a main-engine IDLE state, execution proceeds to state 712. At state 712, which state is referred to as Main Engine_Idle, Nps remains at approximately 80% of operating speed, Nr and Np are increased to less than approximately 80% of operating speed, and SC remains disengaged. From state 712, responsive to a command for the main engine to enter into a FLY state, execution proceeds to state 714. At state 714, which state is referred to as APU_STBY, both Nr and Np are increased to approximately 100% of operating speed, Nps remains at approximately 80% of operating speed, and SC remains disengaged. APU_STBY is a preparatory state for the supplemental engine to enter into SPU mode.

From state 714, execution proceeds to state 716 or state 718. If, at state 714, responsive to a supplemental-engine clutch-in command, SC (e.g., sprag clutch 126) is able to engage the main drive system such that the main drive system can be driven by the supplemental engine as well as by the main engine, execution proceeds to state 716, which state is designated SPU_Run, at which state Np, Nps, and Nr are identical, Ngs is transitioned to a value scheduled by the flight control computer so as to provide required supplemental power.

However, if, at state 714, responsive to the supplemental-engine command to clutch in, SC (e.g., sprag clutch 126) is not able to engage the main drive system such that the main drive system can be driven by the supplemental engine as well as by the main engine, execution proceeds to state 718, which state is designated Clutch Assist, at which state Np and Nr remain at approximately 100% of operating speed, Nps is varied from approximately 80% to approximately 102% of operating speed, and SC is disengaged. The RPM manipulation at state 718 is to cause relative angular motion between male and female parts of the spline clutch so that the splines are able to align, thereby allowing the spline clutch to engage. At states 714-718, the main engine is in Fly mode. When the main engine is in the Fly mode, the engine governs a main rotor of an aircraft to an Np reference. In FIG. 7, this reference is set to 100% so Nr and Np follow this reference in Fly mode.

As noted above, transition of the supplemental engine from APU mode to SPU mode couples the supplemental engine to the main drive system through engagement of a spline clutch (e.g., sprag clutch 126). If SC engagement is successful, execution proceeds from state 718 to state 716. If SC engagement is not successful, Clutch Assist may be repeated in response to an additional command to do so.

Figure 8:
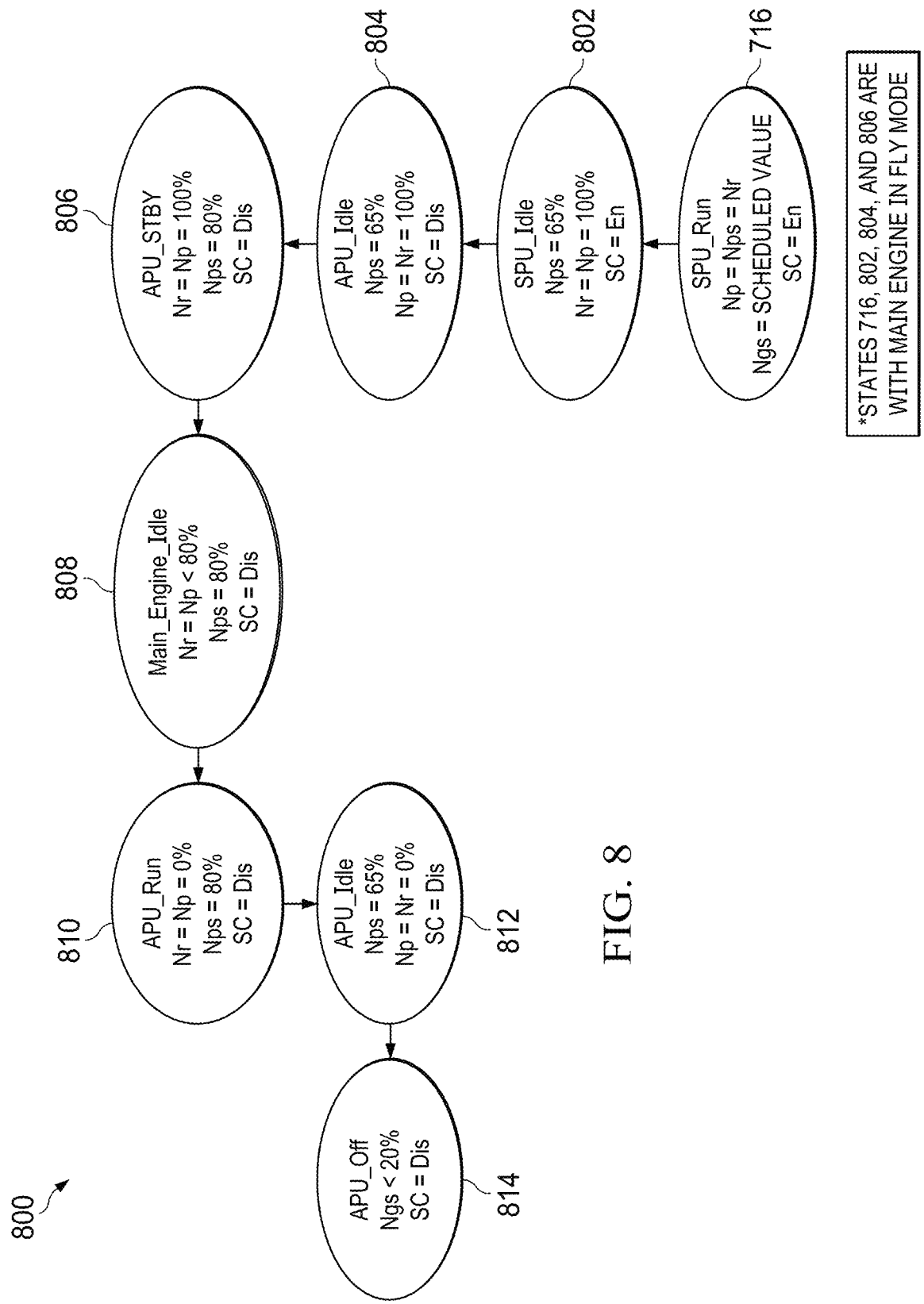
FIG. 8 is a state diagram of an illustrative method of transitioning a supplemental engine from the SPU mode to the APU mode.

FIG. 8 is a state diagram of an illustrative method of transitioning a supplemental engine (e.g., the supplemental engine 114) from the SPU mode to the APU mode. State diagram 800 begins at state 716 (SPU_Run), which is also illustrated in FIG. 7. From state 716, in response to a supplemental-engine command to IDLE, execution proceeds to state 802, which state is designated SPU_Idle, at which state Nps is approximately 65% of operating speed, Nr and Np are 0% of operating speed, and SC remains engaged.

From state 802, response to a supplemental-engine command to CLUTCH OUT (i.e., disengage SC), execution proceeds to state 804, which state is designated APU_Idle, at which state Nps remains approximately 65% of operating speed, Np and Nr are approximately 100% of operating speed, and SC is disengaged. From state 804, responsive to a supplemental-engine Run command, execution proceeds to state 806, which state is designated APU_STBY, at which state Nr and Np remain at approximately 100% of operating speed, Nps is increased to approximately 80%, and SC remains disengaged. At states 716 and 802-806, the main engine is in Fly mode. When the main engine is in the Fly mode, the engine governs a main rotor of an aircraft to an Np reference. In FIG. 8, this reference is set to 100% so Nr and Np follow this reference in Fly mode.

From state 806, responsive to a main-engine command to bring the main engine to IDLE, execution proceeds to state 808, at which state Nr and Np are reduced to less than approximately 80% of operating speed, Nps remains at approximately 80% of operating speed, and SC remains disengaged. From state 808, responsive to a main-engine OFF command, execution proceeds to state 810, which state is designated APU_Run and is identical to state 710 of FIG. 7. From state 810, in response to a supplemental-engine Idle command, execution proceeds to state 812, which state is designated APU_Idle and is identical to state 708 of FIG. 7. From state 812, responsive to a supplemental-engine OFF command, execution proceeds to state 814, which state is designated APU_Off, at which state Ngs is less than approximately 20% of operating speed and SC remains disengaged.

Although various commands have been described herein as being pilot-initiated, those having skill in the art that any of the commands can be initiated by the pilot or by an FCC or other avionics, either onboard or remote from the aircraft, without departing from principles disclosed herein. The terms "substantially," "approximately," "approximately", and "about" is defined as largely but not necessarily wholly what is specified (and includes what is specified; e.g., "substantially 90 degrees" includes 90 degrees and "substantially parallel" includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method of operating a multi-engine drive system of an aircraft, the method comprising:
   driving a main rotor of the aircraft by a main engine of the multi-engine drive system at an operating speed of the main engine;
   operating a supplemental engine of the multi-engine drive system at approximately 80% of an operating speed of the supplemental engine, wherein, during the operating step, a clutch interoperably coupled to the supplemental engine is interoperably decoupled from the main rotor; and
   responsive to a command to interoperably engage the clutch, if the clutch successfully engages such that the clutch is interoperably coupled to the main rotor, providing, by the supplemental engine, power to the main rotor.

2. The method of claim 1, comprising, responsive to the command to engage the clutch, if the clutch fails to successfully engage such that the clutch is interoperably decoupled from the main rotor:
   operating the supplemental engine at a plurality of speeds ranging from approximately 80% to approximately 102% of the operating speed of the supplemental engine; and
   attempting to engage the clutch such that the clutch is interoperably coupled to the main rotor.

3. The method of claim 2, wherein the operating the supplemental engine at a plurality of speeds comprises operating the supplemental engine at approximately 80%, increasing to approximately 102% of the operating speed of the supplemental engine, and decreasing to less than 100% of the operating speed of the supplemental engine.

4. The method of claim 1, comprising, before returning to the operating step, disengaging the clutch such that the clutch is interoperably decoupled from the main rotor.

5. The method of claim 2, comprising, responsive to the step of attempting to engage, if the clutch successfully engages such that the clutch is interoperably coupled to the main rotor, providing, by the supplemental engine, power to the main rotor.

6. The method of claim 5, wherein the driving the main rotor by the main engine and the providing, by the supplemental engine, power to the main rotor overlap in time.

7. The method of claim 1, wherein, during the operating step, the supplemental engine drives an accessory of the aircraft.

8. A method of operating a multi-engine drive system of an aircraft, the method comprising:
   driving a main rotor of the aircraft by a main engine of the multi-engine drive system at an operating speed of the main engine;
   operating a supplemental engine of the multi-engine drive system at an operating speed of the supplemental engine, wherein, during the operating step, a clutch interoperably coupled to the supplemental engine is interoperably coupled to the main rotor;
   responsive to a supplemental-engine idle command, reducing a speed of the supplemental engine to approximately 65% of the operating speed of the supplemental engine, the main engine operating at 100% of the operating speed of the main engine; and
   responsive to a command to disengage the clutch:
      interoperably decoupling the clutch from the main rotor such that the supplemental engine does not provide power to the main rotor; and
      increasing a speed of the main engine to approximately 100% of the operating speed of the main engine.

9. The method of claim 8, comprising, responsive to a supplemental-engine run command, increasing a speed of the supplemental engine to approximately 80% of the operating speed of the supplemental engine.

10. The method of claim 9, comprising, responsive to a main-engine idle command, reducing a speed of the main engine to less than 80% of the operating speed of the main engine.

11. The method of claim 10, comprising, responsive to a main-engine off command, reducing a speed of the main engine to 0% of the operating speed of the main engine.

12. The method of claim 8, comprising, responsive to a supplemental-engine off command, reducing a speed of the supplemental engine to less than approximately 20% of the operating speed of the supplemental engine.

13. A computer system comprising a processor and memory, wherein the processor and the memory in combination are operable to implement a method comprising:
   driving a main rotor of an aircraft by a main engine of a multi-engine drive system at an operating speed of the main engine;
   operating a supplemental engine of the multi-engine drive system at approximately 80% of an operating speed of the supplemental engine, wherein, during the operating step, a clutch interoperably coupled to the supplemental engine is interoperably decoupled from the main rotor; and
   responsive to a command to interoperably engage the clutch, if the clutch successfully engages such that the clutch is interoperably coupled to the main rotor, providing, by the supplemental engine, power to the main rotor.

14. The computer system of claim 13, the method comprising, responsive to the command to engage the clutch, if the clutch fails to successfully engage such that the clutch is interoperably decoupled from the main rotor:
   operating the supplemental engine at a plurality of speeds ranging from approximately 80% to approximately 102% of the operating speed of the supplemental engine; and
   attempting to engage the clutch such that the clutch is interoperably coupled to the main rotor.

15. The computer system of claim 14, the method comprising:
- wherein the operating the supplemental engine at a plurality of speeds comprises operating the supplemental engine at approximately 80%, increasing to approximately 102% of the operating speed of the supplemental engine, and decreasing to less than 100% of the operating speed of the supplemental engine.

16. The computer system of claim 13, the method comprising, before returning to the operating step, disengaging the clutch such that the clutch is interoperably decoupled from the main rotor.

17. The computer system of claim 14, the method comprising, responsive to the step of attempting to engage, if the clutch successfully engages such that the clutch is interoperably coupled to the main rotor, providing, by the supplemental engine, power to the main rotor.

18. The computer system of claim 17, the method comprising:
- wherein the driving the main rotor by the main engine and the providing, by the supplemental engine, power to the main rotor overlap in time.

19. The computer system of claim 13, the method comprising:
- wherein, during the operating step, the supplemental engine drives an accessory of the aircraft.

* * * * *